United States Patent [19]
Budde et al.

[11] Patent Number: 5,772,570
[45] Date of Patent: Jun. 30, 1998

[54] AIRBAG FOLDING ENGINE ADAPTABLE FOR FOLDING A PLURALITY OF AIRBAG DESIGNS

[75] Inventors: William Joseph Budde, Dayton; Douglas Michael Donahue, Jr., Bellbrook, both of Ohio; Louis Anthony Fanty, Palm Harbor, Fla.; Scott Franklin Mason, New Carlisle, Ohio

[73] Assignee: Omega Automation, Inc., Dayton, Ohio

[21] Appl. No.: 728,538

[22] Filed: Oct. 9, 1996

Related U.S. Application Data

[63] Continuation of Ser. No. 209,303, Mar. 10, 1994, Pat. No. 5,575,748.

[51] Int. Cl.$^6$ .................................................. B60R 21/16
[52] U.S. Cl. ........................................ 493/405; 493/243
[58] Field of Search ................................ 493/405, 243, 493/468, 473, 474, 475, 480; 280/728.1

[56] References Cited

U.S. PATENT DOCUMENTS

| | | |
|---|---|---|
| 1,657,911 | 1/1928 | Anthony . |
| 3,711,086 | 1/1973 | Weist . |
| 3,839,947 | 10/1974 | Kornas et al. . |
| 3,839,948 | 10/1974 | Putti et al. . |
| 3,919,827 | 11/1975 | Larson et al. . |
| 4,235,453 | 11/1980 | Lawson et al. . |
| 4,351,544 | 9/1982 | Ross . |
| 4,903,986 | 2/1990 | Cok et al. . |
| 5,022,675 | 6/1991 | Zelenak, Jr. et al. . |
| 5,162,035 | 11/1992 | Baker ...................................... 493/405 |
| 5,163,893 | 11/1992 | Hara ........................................ 493/458 |
| 5,375,393 | 12/1994 | Baker ........................................ 53/429 |
| 5,391,137 | 2/1995 | DePoy et al. . |

FOREIGN PATENT DOCUMENTS

6191719  7/1994  Japan .

*Primary Examiner*—Jack W. Lavinder
*Attorney, Agent, or Firm*—Killworth, Gottman, Hagan & Schaeff, L.L.P.

[57] ABSTRACT

An airbag folding engine comprises a frame for removably mounting any one of a number of different airbag folding devices. The airbag folding engine includes a driver system adapted to be removably connected to the airbag folding device mounted on the frame. The driver system, which may be pneumatic, hydraulic, electrical or the like, provides the power to operate the airbag folding device. A control system mounted on the airbag folding engine controls the operation of the airbag folding device. A visual display provides a visual indication of the operation of the airbag folding device. Screw jacks may be mounted on the frame for varying the height of the airbag folding engine. An apparatus for folding an airbag which is adapted to be removably mounted on the airbag folding engine is also provided. The apparatus includes a plate which mounts on the airbag folding engine and an airbag folding mechanism mounted on the plate for folding one of a number of types of airbags.

5 Claims, 7 Drawing Sheets

AIRBAG FOLDING ENGINE ADAPTABLE FOR FOLDING A PLURALITY OF AIRBAG DESIGNS

This is a continuation of application Ser. No. 08/209,303 filed Mar. 10, 1994 now U.S. Pat. No. 5,575748.

BACKGROUND OF THE INVENTION

The present invention relates generally to automated airbag folding machines and, more particularly, to an airbag folding engine on which any one of a number of different airbag folding devices can be removably mounted and airbag folding apparatus adapted to be mounted on the airbag folding engine.

Motor vehicle manufacturers are increasingly installing driver and passenger airbags in their vehicles. Airbags are typically circular, oval or pillow-shaped and are commonly mounted in the steering wheels, steering columns and dashboards of automobiles. Only a limited space is available for storing the airbag. Thus, the airbag is folded into a particular folding pattern to fit within this limited space. The airbag must, however, be capable of unfolding and inflating rapidly without binding. Consequently, the physical characteristics and folding pattern of any one airbag is dictated, in part, by the structure and configuration of the interior of the vehicle in which it is installed. As one would expect, there is a multiplicity of airbag designs and folding patterns to accommodate the numerous vehicle designs. Correspondingly, there are many methods by which an airbag may be folded into a desired folding pattern. Oftentimes, these methods are performed manually; however, manual methods are time-consuming, costly and usually result in airbags having inconsistent folds.

Semi-automated and automated airbag folding machines are being increasingly employed in the industry to overcome the shortcomings of manual folding methods. Unfortunately, due to the differences in the designs and folding patterns of the various airbags, specialized airbag folding machines have to be designed and manufactured for each type of airbag and folding pattern. When a vehicle model is no longer produced, the corresponding airbag folding machine is discarded and a new folding machine must be produced to meet the requirements of the new vehicle models.

Vehicle manufacturers are, therefore, continually discarding usable equipment and expending substantial resources for the design and manufacture of new airbag folding machines. Furthermore, vehicle manufacturers are somewhat restricted in their planning and implementing of the manufacturing process for a new vehicle until a new airbag folding machine is designed. For instance, the manufacturer is unable to allocate and optimize manufacturing space without knowing the physical characteristics of the airbag folding machine, such as size and utilities required. Consequently, "change-over" time from one vehicle model to another vehicle model may be increased.

It is thus apparent that a need exists in the art for a airbag folding machine apparatus which can, at least in substantial part, be used and re-used with a number of types of airbag folding devices. Such apparatus would reduce the cost and development times of new types of airbag folding devices. Further, it would provide a standard "footprint", or floor area, for the numerous airbag folding devices to permit increased flexibility in planning and implementing the manufacturing process for new vehicle models. Such apparatus would preferably use substantially the same utilities for performing airbag folding, such as pressurized gas, pressurized fluid, or electrical power. Further, since the apparatus would be readily adaptable to a wide variety of vehicle models, it could be used for many vehicle models thus further reducing costs by using the same apparatus across a large number of vehicle lines.

SUMMARY OF THE INVENTION

This need is met by the airbag folding engine of the present invention which supports a plurality of types of individualized airbag folding devices. When the style of airbag being folded is changed, the airbag folding engine is used with a new airbag folding device. The airbag folding engine preferably includes a driver system which easily and removably connects to the airbag folding device. The driver system may, for example, provide hydraulic, pneumatic and/or electrical power to whatever airbag folding device is currently connected. Further, the airbag folding engine preferably includes a control system for monitoring and controlling the operation of the currently connected airbag folding device. Four adjustable supports, such as screw jacks, permit an operator to raise and lower the airbag folding engine, and hence the currently connected airbag folding device, to an optimum operating height for the operator.

In accordance with one aspect of the present invention, a airbag folding engine for supporting one of a plurality of types of airbag folding devices is provided. Each type of airbag folding device is capable of folding a different type of airbag. The airbag folding engine comprises a frame for removably mounting any one of the plurality of airbag folding devices and a driver system mounted on the frame and adapted to be removably connected to an airbag folding device mounted on the frame for effecting operation of the airbag folding device. At least one mounting device may be provided on the frame for removably securing an airbag folding device to the frame.

To control the operation of an airbag folding device mounted on the frame, a control system is mounted on the frame and adapted to be removably connected to the airbag folding device. A visual display may be included for monitoring at least one operational characteristic of the airbag folding device on the airbag folding engine. The control system may comprise at least one safety device for disconnecting electrical power to at least a portion of the airbag folding device when an operator comes into close proximity with the airbag folding device during operation thereof.

The driver system may comprise, singly or in combination, a pneumatic distribution system for providing pressurized gas to the airbag folding device mounted on the frame, a hydraulic distribution system for providing pressurized fluid to the airbag folding device mounted on the frame and an electrical distribution system for providing electrical power to the airbag folding device mounted on the frame. To facilitate movement of the airbag folding engine, a plurality of wheels are mounted on the frame. A lift system raises and lowers the frame to adjust the height of the airbag folding engine to accommodate a variety of operators. The lift system comprises a motor mounted on the frame, at least one rear screw jack mounted on the frame operably connected to the motor and at least one front screw jack mounted on the frame operably connected to the at least one rear screw jack. A drive chain may operably connect the rear screw jack to the front screw jack. An airbag air control assembly adapted to be removably connected to the one airbag folding device is provided for generating air pressure in an airbag being folded in the one airbag folding device.

In accordance with another aspect of the present invention, a airbag folding engine for supporting one of a plurality of types of airbag folding devices is provided. Each type of airbag folding device being capable of folding a different type of airbag. The airbag folding engine comprises a frame for removably mounting any one of the airbag folding devices and a control system mounted on the frame and adapted to be removably connected to the one airbag folding device mounted on the frame for controlling operation of the one airbag folding device. The control system may comprise a visual display for monitoring at least one operational characteristic of the one airbag folding device on the airbag folding engine.

A pneumatic distribution system may be mounted on the airbag folding engine for providing pressurized gas to the airbag folding device mounted on the frame of the airbag folding engine. An electrical system may also be mounted on the airbag folding engine for providing electrical power to the airbag folding device mounted on the airbag folding engine.

In accordance with yet another aspect of the present invention, an apparatus for folding one of a number of types of airbags is provided. The airbag folding apparatus is capable of being removably mounted on a airbag folding engine including a driver system and a control system. The airbag folding apparatus comprises a plate adapted to be removably mounted on the airbag folding engine and an airbag folding mechanism mounted on the plate for folding an airbag, the airbag folding mechanism including a plate driver system adapted to be removably and operably connected to the engine driver system of the airbag folding engine for effecting operation of the airbag folding mechanism and a plate control system adapted to be removably and operably connected to the engine control system of the airbag folding engine for controlling the operation of the airbag folding mechanism. The plate driver system may comprise a pneumatic system.

These and other features and advantages of the present invention will become apparent from the following detailed description, the accompanying drawings and the appended claims.

DETAILED DESCRIPTION OF THE INVENTION

Figure 1:
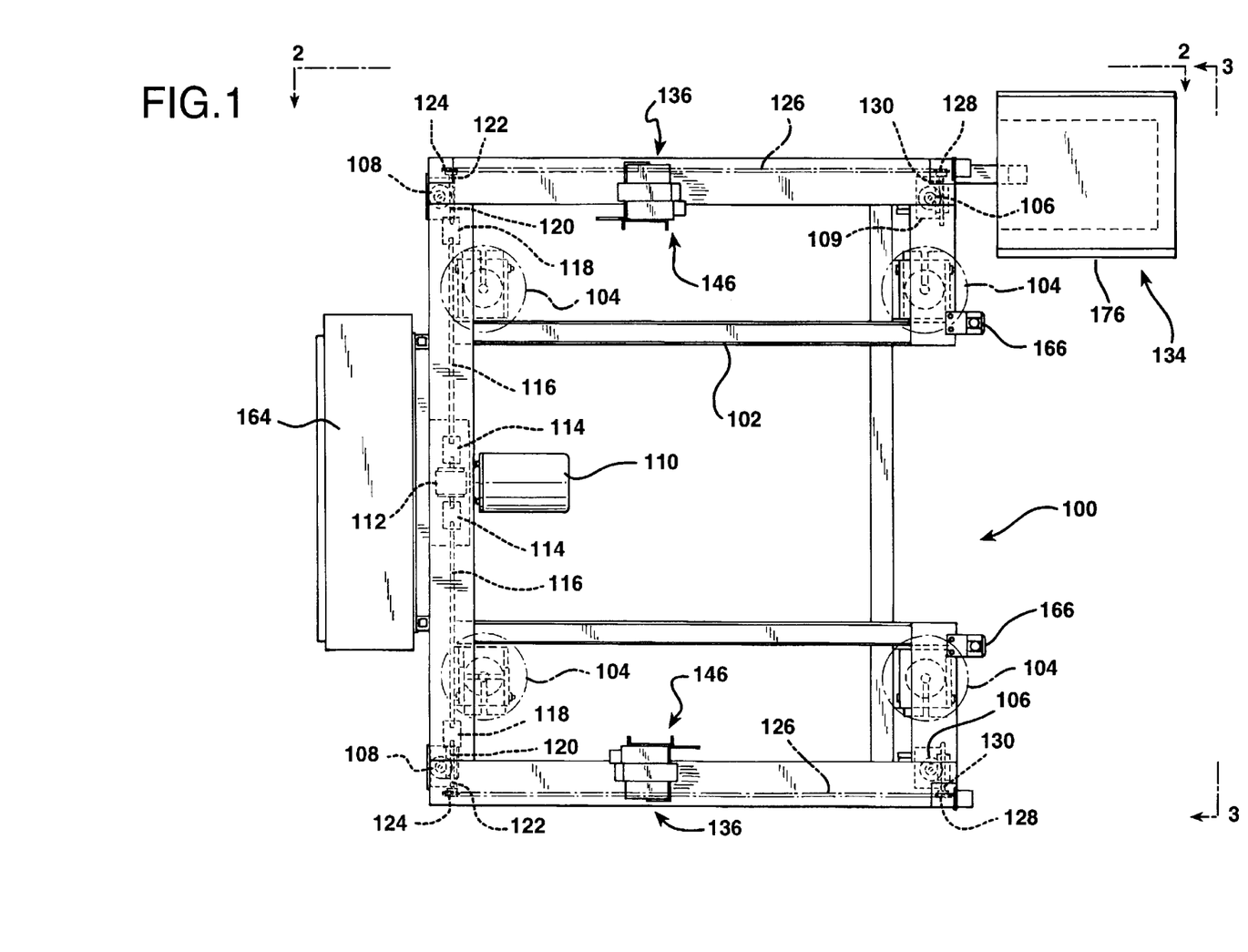
FIG. 1 is a top plan view of an airbag folding engine for supporting one of a plurality of types of airbag folding devices including a pneumatic distribution system in accordance with the present invention.
Figure 4:
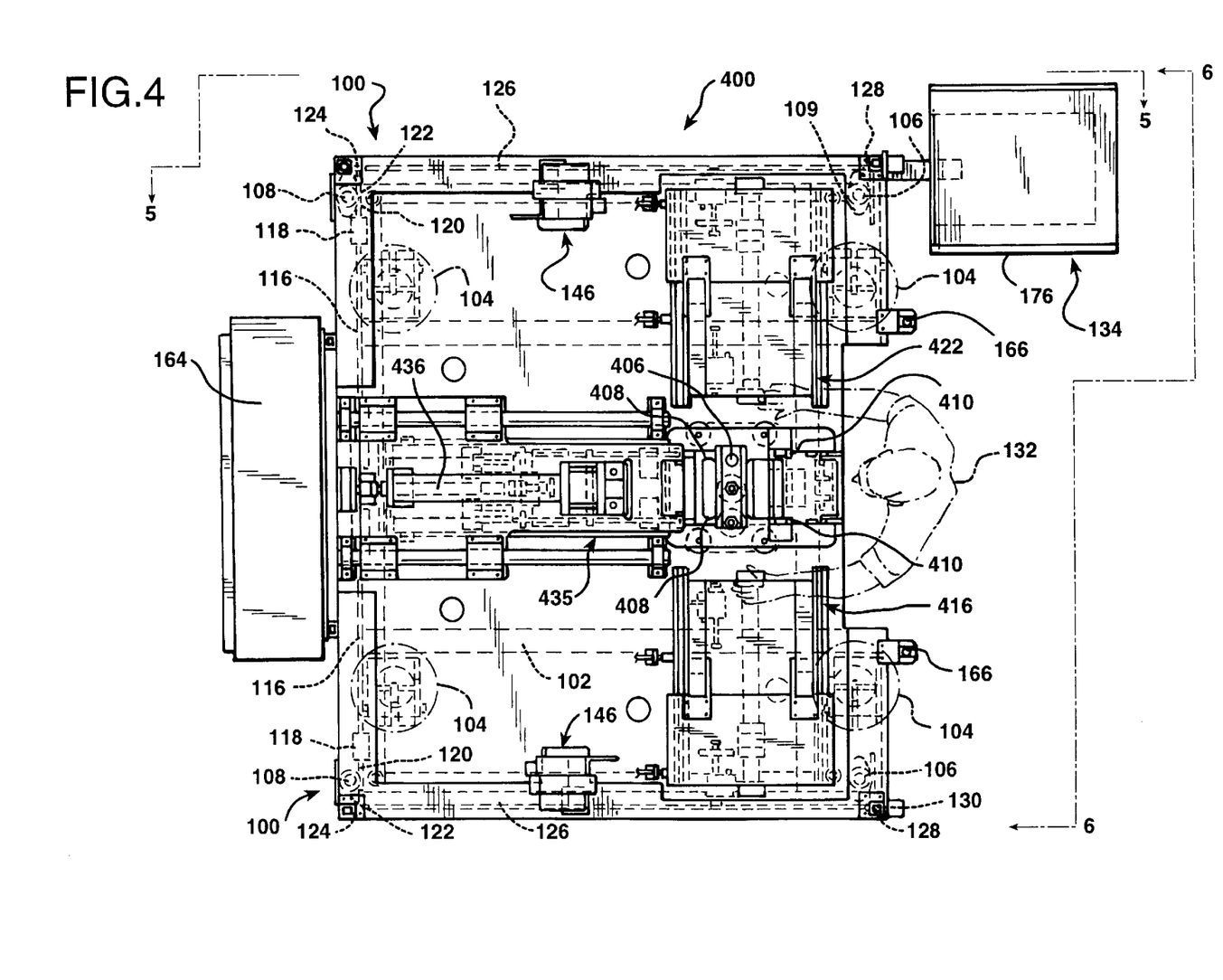
FIG. 4 is a top plan view of the airbag folding engine shown in FIG. 1 having an exemplary airbag folding mechanism, or device, mounted thereon in accordance with the present invention.
Figure 5:
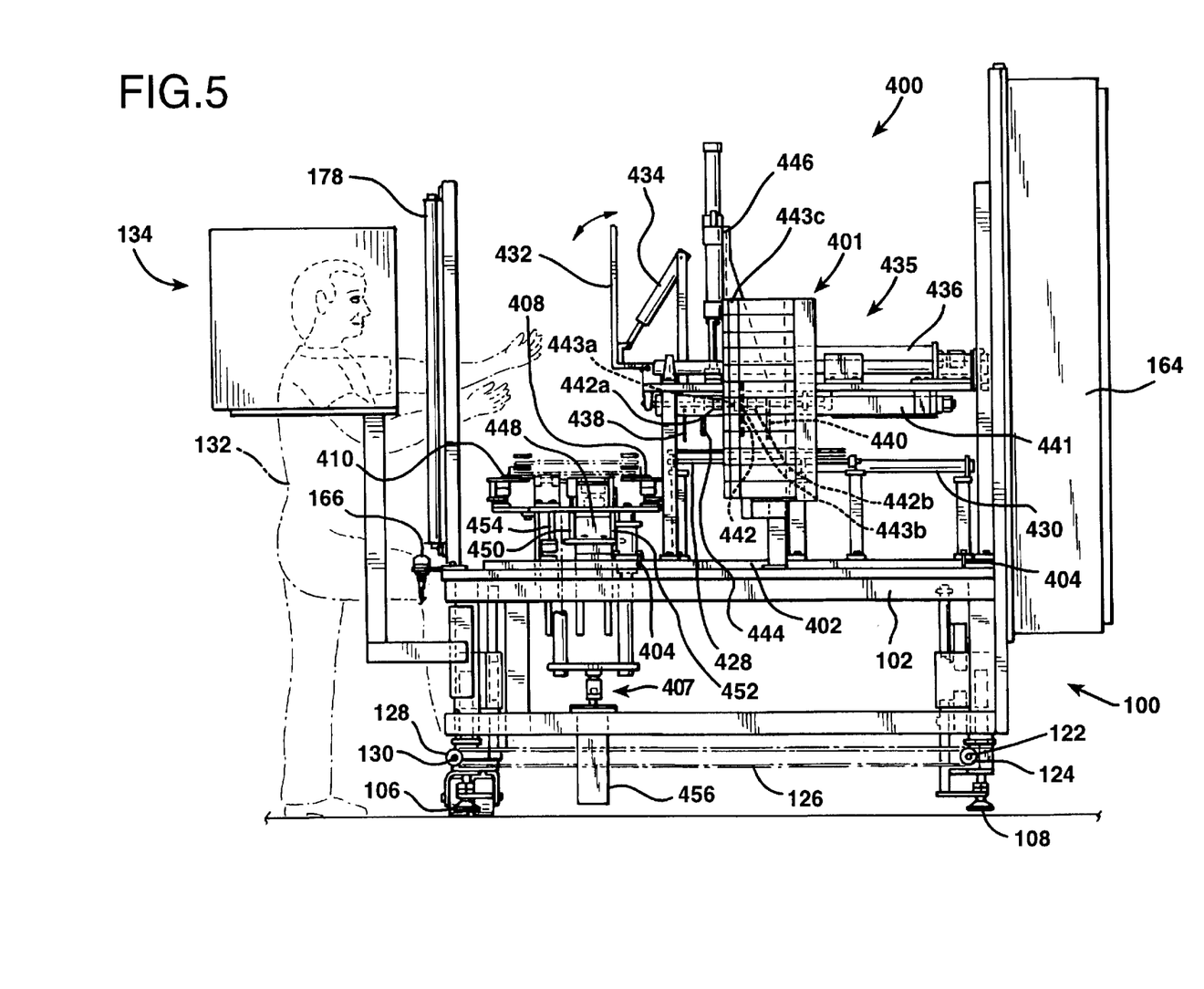
FIG. 5 is a side elevation view of the airbag folding engine and airbag folding mechanism shown in FIG. 4.
Figure 6:
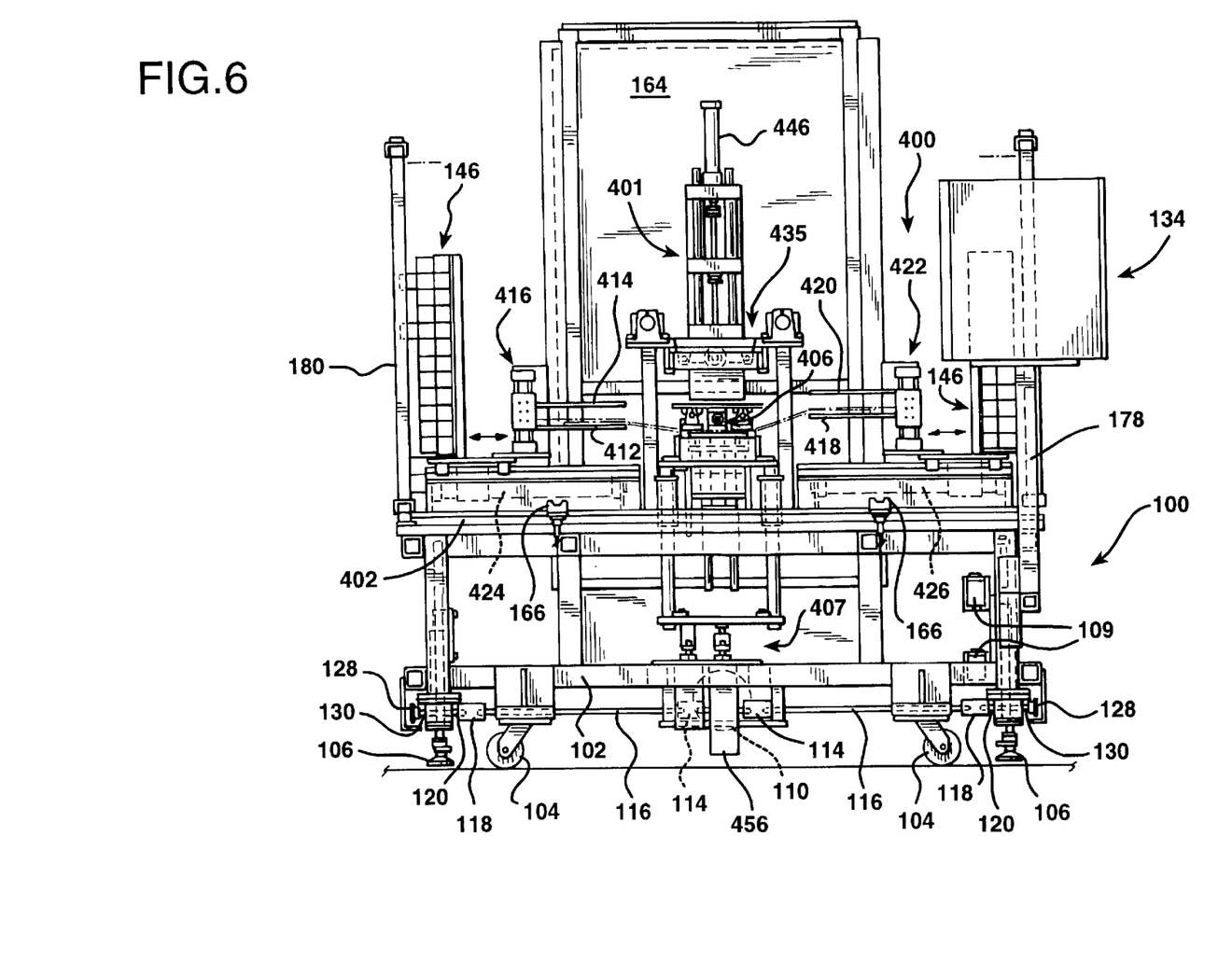
FIG. 6 is a front elevation view of the airbag folding engine and airbag folding mechanism shown in FIG. 4.

An airbag folding engine 100 for supporting one of a plurality of types of airbag folding devices, one type of which is shown in FIGS. 4 through 6, in accordance with the present invention is shown in FIG. 1. The airbag folding engine 100 is adapted to support a variety of airbag folding devices which fold different types of airbags. This interchangability is very important since substantially every new type of airbag requires a redesigned airbag folding device.

Figure 3:
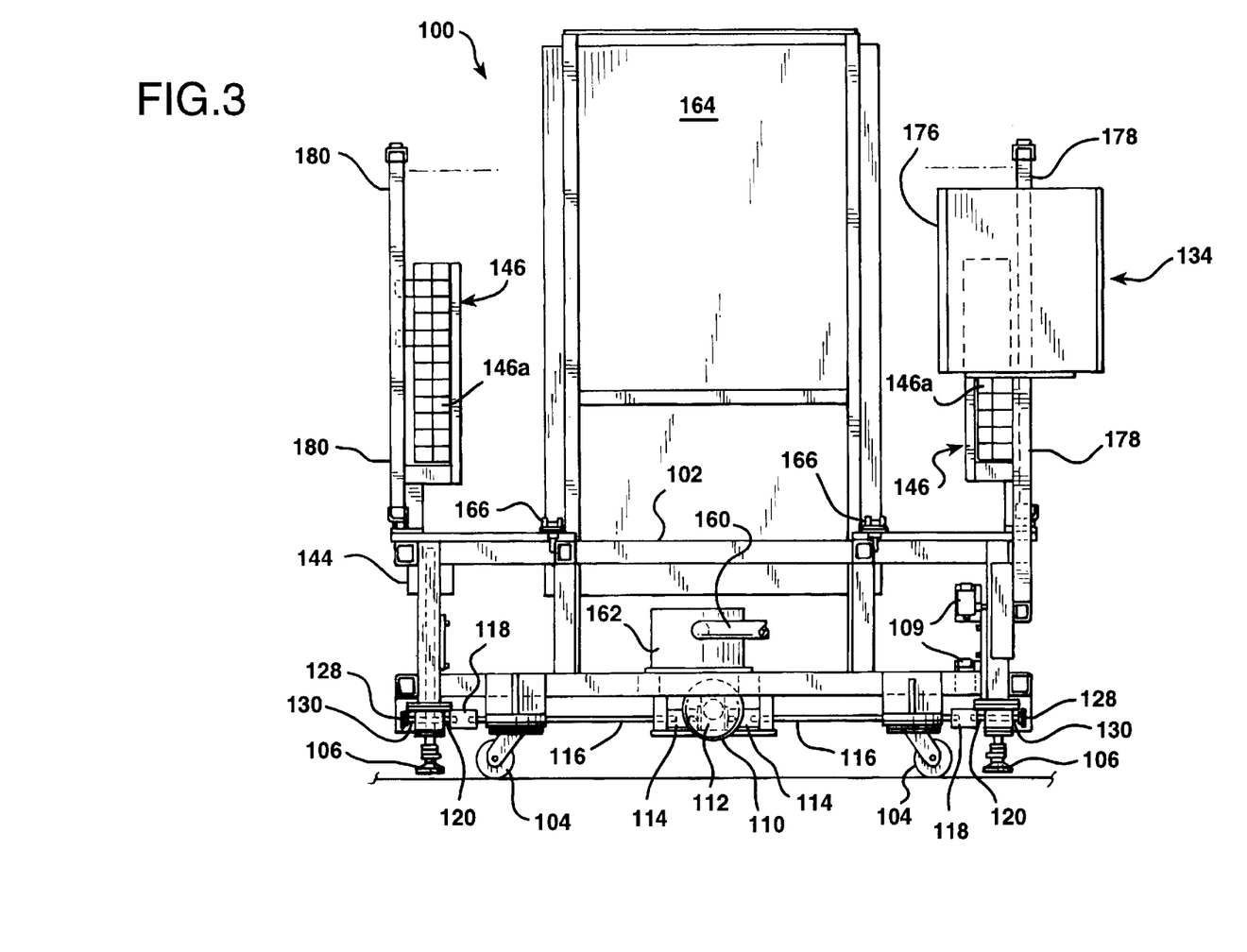
FIG. 3 is a front elevation view of the airbag folding engine shown in FIG. 1.

The airbag folding engine 100 comprises a frame 102 for removably mounting any one airbag folding device. The frame 102 has a plurality of wheels 104 for permitting movement of the airbag folding engine 100. A lift system comprising a plurality of adjustable supports, such as front screw jacks 106 and rear screw jacks 108, raise and lower the height of the airbag folding engine 100 such that an operator may adjust the working height of the airbag folding device supported by the airbag folding engine 100. A pair of limit switches 109 limit the upward and downward travel of the screw jack 106 in a conventional manner, see FIGS. 1 and 3.

An electric motor 110 operates the rear screw jacks 108 through a conventional right angle gearbox 112, a pair of first couplings 114, a pair of drive shafts 116 and a pair of second couplings 118. The second couplings 118 are coupled to rear input shafts 120 of the rear screw jacks 108.

The screw jacks 106, 108 may have any of a number of conventional dual shaft designs, as are well known in the art. Rear screw jacks 108 include rear output shafts 122 having rear chain gears 124 mounted thereon. Drive chains 126 drive corresponding front chain gears 128 on the front screw jacks 106. Front chain gears 128 are fixedly mounted on front input shafts 130 such that rotation of the chains 126 causes rotation of the front input shafts 130 to raise and lower the front screw jacks 106. The motor 110 thus actuates all four of the screw jacks 106, 108 substantially simultaneously to raise and lower the airbag folding engine 100. The motor 110 is operated by an operator 132 through a conventional motor control circuit. Typically, the control devices, such as raise and lower switches, are mounted on a control panel 134.

Figure 2:
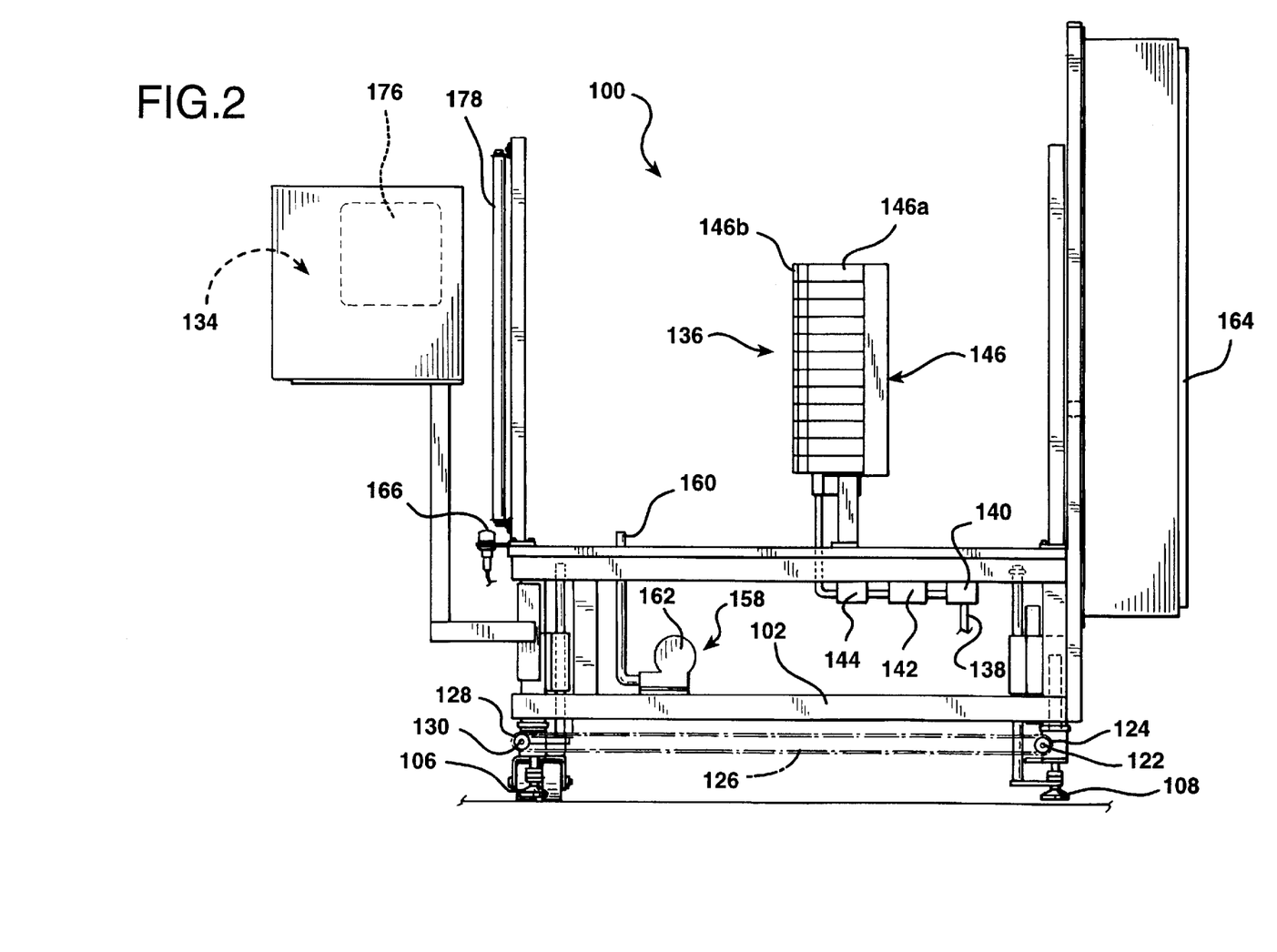
FIG. 2 is a side elevation view of the airbag folding engine shown in FIG. 1 further including an airbag air control assembly.

A driver system 136 is mounted on the airbag folding engine 100 for effecting operation of the one airbag folding device supported by the frame 102, see FIG. 2. Airbag folding devices are typically pneumatic; however, as those skilled in the art will readily comprehend, they may also be hydraulic or electric. For a pneumatic airbag folding device, the driver system 136 includes a pneumatic distribution system comprising an air inlet line 138 for connecting to an air source, such as an air compressor (not shown). From the air inlet line 138, pressurized air, or appropriate gas, traverses an air filter 140, an air pressure regulator 142 and a lubricator 144. A bank 146 of pneumatic valves 146a is connected to the lubricator 144 for regulating the flow of air to a connected airbag folding device and for readily connecting the pneumatic distribution system to a reasonable of a number of pneumatic hoses on the air bag folding device mounted on the airbag folding engine 100.

Each pneumatic valve 146a of the bank 146 includes a conventional connector 146b for connecting to a pneumatic hose on an airbag folding device mounted on the frame 102. All of the components of the pneumatic distribution system are well known in the art and, therefore, will not be described further herein. It should also be understood that the pneumatic distribution system shown in the figures and described herein is for exemplary purposes only and other configurations, with more or less components, may be suitable for use with the present invention.

Figure 2A:
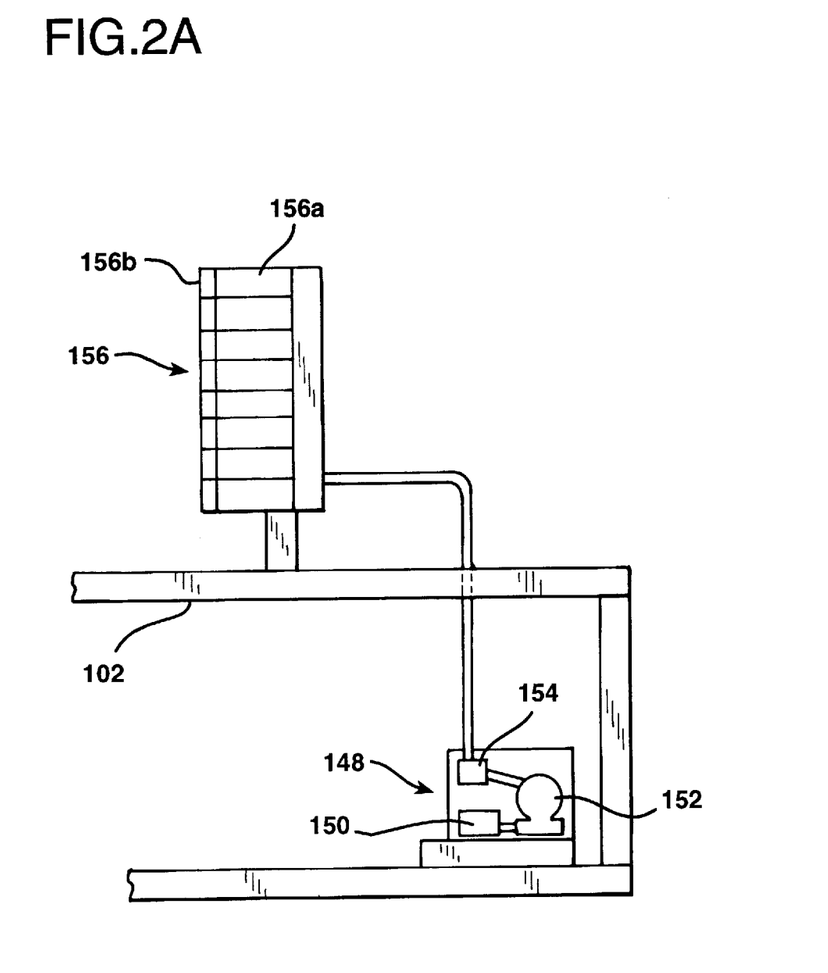
FIG. 2A is a partial side elevation view of the airbag folding engine in FIG. 1 including a hydraulic distribution system.

As shown in FIG. 2A, a hydraulic distribution system 148 may be provided on the airbag folding engine 100 for providing pressurized hydraulic fluid to a connected airbag folding device. Basically, the hydraulic distribution system 148 includes a reservoir 150, a pump 152, a hydraulic filter 154 and a bank 156 of hydraulic valves 156a. Each hydraulic valve 156a of the bank 156 includes a conventional connector 156b for connecting to hydraulic hoses, or tubes, from any of a number of different airbag folding devices. The hydraulic distribution system 148 is comprised of conventional components which will not be further discussed herein. The hydraulic distribution system 148 is shown only as an example and other configurations which are suitable for use in the present invention may be readily contemplated by those skilled in the art.

An airbag air control assembly 158 is provided on the airbag folding engine 100 for inflating and deflating an airbag as the airbag is being folded. The airbag air control assembly 158 comprises an air tube 160 connected to a blower 162. The air tube 160 can be readily connected to and disconnected from a number of airbag folding devices in a conventional manner.

A control system is mounted on the airbag folding engine 100 for controlling the operation of the airbag folding device mounted on the frame 102, the airbag air control assembly 158 and the driver system 136. The control system is adapted to be connected to electrical connectors provided on each of the different types of airbag folding devices. A conventional electrical enclosure 164 contains a variety of conventional electrical control components. For example, the electrical enclosure 164 may contain conventional transformers, relays, AC/DC converters and a programmable logic controller (pLC) for providing the required AC and DC power and control to the airbag folding device mounted on the frame 102 and the pneumatic, hydraulic or electrical components mounted on the airbag folding engine 100.

The control system includes the control panel 134 which may comprise a visual display 176, such as a conventional cathode-ray tube (CRT) display, for permitting the operator 132 to monitor at least one operational characteristic of the airbag folding device or the airbag folding engine 100, see FIGS. 1 and 2. A suitable visual display is commercially available from General Electric and is designated the General Electric panel View Monitor. The control panel 134 may also include conventional pushbuttons, and the like, which are actuated by the operator 132 to control the operation of the airbag folding device and the airbag folding engine 100. At least one pushbutton, shown as Banner Opto-Touch switches 166 see FIG. 2, is actuated by the operator 132 to begin operating an airbag folding device via the airbag folding engine 100 on which it is mounted. As discussed below, the operator 132 manually places each new airbag into the airbag folding device. Thereafter, the operator 132 actuates at least one of the switches 166 to operate the airbag folding device.

A safety device mounted on the frame 102 disconnects power to at least a portion of the airbag folding device mounted on the airbag folding engine 100 whenever the operator 132, or any other person, comes into close proximity with the airbag folding device during operation thereof. For example, a light curtain is generated by a light transmitter 178 and received by a light receiver 180 in front of the airbag folding device when the device is in operation, see FIGS. 2 and 3. If the operator 132 traverses the light curtain, the control system detects the discontinuity in the light curtain and disconnects power to at least a portion of the airbag folding device. Such light curtain safety systems are commercially available and well known in the art. Consequently, further discussion of the operation of the light curtain will not be given herein.

FIGS. 4 through 6 show an exemplary apparatus 400 for folding one of a number of types of airbags being removably mounted on the airbag folding engine 100. Since the present invention is not directed directly to the airbag folding apparatus 400, only a brief description of the operation of the apparatus 400 will be given herein. As should be readily evident to those skilled in the art, the airbag folding engine 100 can support any of a number of different configurations of airbag folding apparatus. For example, the airbag folding apparatus disclosed in commonly assigned U.S. pat. application Ser. No. 08/145,968, filed Oct. 29, 1993, entitled "Airbag Folding Apparatus and Method", the disclosure of which is hereby incorporated by reference, may be readily modified for use with the present invention.

The apparatus 400 comprises an airbag folding mechanism 401 mounted on a plate 402 which is adapted to be removably mounted on the frame 102. As shown in FIG. 5, at least one mounting device, such as bolts 404, clamps or the like, is provided to secure the plate 402 to the frame 102. The airbag folding mechanism 401 includes a plate driver system adapted to be removably and operably connected to the driver system 136 of the airbag folding engine 100 shown in FIG. 2 for effecting operation of the airbag folding mechanism 401. The airbag folding mechanism 401 comprises a plate control system adapted to be removably and operably connected to the control system of the airbag folding engine 100 for controlling the operation of the airbag folding mechanism 401.

It should be understood that individualized programs for the programmable logic controller (pLC) contained within the electrical enclosure 164 will normally be required. Individualized programs are generally required since each airbag folding device, such as the apparatus 400 shown in FIGS. 4 through 6 and the airbag folding apparatus disclosed in U.S. patent application Ser. No. 08/145,968 which was incorporated by reference, contain a different number of pneumatic hoses, hydraulic hoses, and/or electrical connectors. In addition, the operational sequence of each airbag folding device will likely be different. Since these programs are well known in the art and can be readily prepared in accordance with an airbag folding device which is secured to the frame 102, they will not be described in detail herein.

The airbag folding engine 100 of the present invention is thus designed to support and provide pneumatic, hydraulic and electrical power and electrical control to a number of different types of airbag folding devices. The pneumatic and hydraulic valve banks 146, 156 are adapted to connect to a reasonable number of pneumatic or hydraulic hoses on an airbag folding device. The control system of the airbag folding engine 100 can be readily adapted to control the operation of a number of types of airbag folding devices. Consequently, the airbag folding engine 100 is reusable with a number of different airbag folding devices.

The operation of the airbag folding mechanism 401 will now be described with reference to FIGS. 4 through 6. Airbags typically have a type of retainer ring surrounding the airbag opening. The operator 132 securely clamps the retainer ring into a retainer fixture mechanism 406. The retainer fixture mechanism 406 is connected to an accordion fold fixture slide 407 which vertically raises and lowers the retainer fixture mechanism 406, and thus the airbag, into three different vertical positions, as discussed more fully below. During the loading of the airbag, the accordion fold fixture slide mechanism 407 is in the first, or lowest, position.

The retainer fixture mechanism 406 may consist of pneumatic, hydraulic or electrically operated clamps which clamp the retainer ring in position. If the retainer ring has one or more apertures formed therein, the retainer fixture mechanism 406 includes pins which are inserted into corresponding apertures to further secure the ring in position.

The operator 132 folds the top of a rear portion of the airbag toward the center of the bag and actuates a pair of rear rotary fingers 408 which rotate onto the airbag to define a pleat in the rear portion of the airbag. Similar to the rear portion, the top of a front portion of the airbag is folded by the operator 132 and a pair of front rotary fingers 410 are rotated onto to the airbag to define a pleat in the front portion of the airbag. The rear and front rotary fingers 408, 410 are operated at a low pressure during the loading of the airbag to reduce the risk of injury to the operator 132. As described herein, it should be understood that the front portion of the airbag is the portion nearest the operator 132 and the rear portion is the portion of the airbag opposite the front portion when the airbag is secured in the retainer fixture mechanism 406. Similarly, left and right portions of the airbag will designate portions of the airbag to the respective left and right of the operator 132.

As shown in FIG. 6, the left portion of the airbag is positioned between a left resting plate 412 and a left tuck fold gripper plate 414 which are included in a left tuck fold mechanism 416. The right portion of the airbag is similarly positioned between a right resting plate 418 and a right tuck fold gripper plate 420 which are included in a right tuck fold mechanism 422. The left and right tuck fold mechanisms 416, 422 reciprocate toward and away from the retainer fixture mechanism 406 along a pair of respective rods 424, 426. The left and right tuck fold gripper plates 414, 420 also reciprocate toward and away from their respective left and right resting plates 412, 418.

Hereafter, the operator 132 must be clear of the light curtain or the control system will prohibit further operation of the airbag folding mechanism 401. After moving away from the light curtain, the operator 132 actuates one of the switches 166 to begin operation of the airbag folding mechanism 401. Upon actuation of one of the switches 166, the rear and front rotary fingers 408, 410 are placed under high pressure to securely grip the rear and front portions of the airbag, respectively.

The left tuck fold gripper plate 414 travels toward the left resting plate 412 to secure the left portion of the airbag therebetween. Similarly, the right portion of the airbag is secured between the right tuck fold gripper plate 420 and the right resting plate 418.

A rear plate definition slide 428, shown in FIG. 5, slides over the top of the rear rotary fingers 408 to further define the pleat in the rear portion of the airbag. The rear plate definition slide 428 is actuated by a cylinder 430. An airbag containment cover 432 is then lowered onto the top of the airbag by a cylinder 434. The airbag air control assembly 158 is subsequently activated to expand the airbag until the airbag contacts the airbag containment cover 432.

The left tuck fold mechanism 416 moves toward the center of the airbag. After the left resting plate 412 and the left fold tuck gripper plate 414 are substantially aligned with the center of the airbag, the right tuck fold mechanism 422 moves toward the center of the airbag until the right resting plate 418 is substantially directly above the left fold tuck gripper plate 414. As should be noted, the right resting plate 418 is slightly higher than the left tuck fold gripper plate 414 to permit the vertical alignment of the left and right tuck fold mechanisms 416 and 422.

The airbag is then evacuated by the airbag air control assembly 158. The right tuck fold gripper plate 420 moves away from the right resting plate 418 to release the right portion of the airbag. The right tuck fold mechanism 422 retracts away from the airbag. The left tuck fold gripper plate 414 similarly moves away from the left resting plate 412 to release the left portion of the airbag and the left tuck fold mechanism 416 moves away from the airbag. The airbag containment cover 432 swings upward away from the airbag and the rear pleat definition slide 428 is retracted.

An upper definition slide assembly 435 is moved over the airbag by means of a cylinder 436. The upper definition slide assembly 435 includes front and rear upper blades 438, 440. When the upper definition slide assembly 435 is positioned over the airbag, the front and rear upper blades 438, 440 are positioned substantially over the front and rear portions of the airbag. Front and rear upper blades 438, 440 are reciprocated toward and away from each other by a gripper cylinder 441, see FIG. 5. A stationary center blade 442 is positioned between the front and rear upper blades 438, 440 has a pair of stops 442a, 442b located on the front and back side thereof. A pair of retractable stripper blades 443a and 443b reciprocate on each side of the center blade 442 between the center blade 442 and each of the stops 442a, 442b. The stripper blades 443a and 443b are reciprocated by a stripper cylinder 443c. A vertically retractable upper blade 444, vertically operated by a vertical cylinder 446, is positioned between the center blade 442 and the front upper blade 438.

The accordion fold fixture slide 407 lifts the airbag into a second position, or fold position. In the second position, the front and rear upper blades 438, 440 are close to or touching the airbag. The front and rear rotary fingers 408, 410 are rotated away from the airbag. The accordion fold fixture slide 407 includes a rear accordion definition blade assembly 448 comprising front and rear interconnected blades 450, 452. When translated upward, the interconnected blades 450, 452 surround the retainer ring of the airbag and the center blade 442. The accordion fold fixture slide 407 further includes a movable front accordion definition blade 454.

Interconnected blades 450, 452 are moved upward by a cylinder 456 until they encompass the center blade 442. The front accordion definition blade 454 is also moved upward between the front upper blade 438 and the retractable upper blade 444. The front and rear upper blades 438, 440 are then gradually moved toward each other until the front upper blade 438 and the rear upper blade 440 meet a significant amount of resistance. This resistance is usually generated by the airbag being compressed against the rear interconnected blade 452 and the front accordion definition blade 454.

The front accordion definition blade 454 is subsequently retracted from the airbag. The front upper blade 438 now continues traveling toward the rear upper blade 440. The rear upper blade 440 does not move, or moves very little, since it is abutting the rear interconnected blade 452. The front upper blade 438 finally contacts the retractable upper blade 444. The retractable upper blade 444 is then retracted vertically upward away from the airbag. The front upper blade 438 continues to travel toward the rear upper blade 440 until it contacts the front interconnected blade 450. The interconnected blades 450, 452 are then retracted from the airbag and the front and rear upper blades 438, 440 converge on each side of the center blade 442 until they contact respective stops 442a and 442b.

The accordion fold fixture slide 407 then raises the airbag into a third position. As the airbag is raised, the front and rear upper blades 438, 440 and the center blade 442 force the folded airbag into the retainer ring of the airbag. After the airbag has been forced into the retainer ring, the pressure on the front and rear upper blades 438, 440 is reduced. The stripper blades 443*a*, 443*b* then travel downward to force the airbag away from the center blade 442.

The accordion fold fixture slide 407 is subsequently lowered into the first position and the stripper blades 443*a*, 443*b* retracted upward. The upper definition slide assembly 435 is retracted away from the airbag. The airbag is then released from the retainer fixture mechanism 406 and removed from the airbag folding mechanism 401. Having thus described the invention in detail by way of reference to preferred embodiments thereof, it will be apparent that other modifications and variations are possible without departing from the scope of the invention defined in the appended claims.

What is claimed is:

1. An airbag folding apparatus removably mounted on an airbag folding engine, said airbag folding apparatus comprising:

plate operatively adapted to be removably mounted on an airbag folding engine for supporting one of a plurality of types of air bag folding mechanisms, each type of airbag folding mechanism being capable of folding a different type of airbag; and an airbag folding mechanism mounted on said plate for folding an airbag, said airbag folding mechanism being operatively adapted to be removably and operably connected to the airbag folding engine for effecting the operation of said airbag folding mechanism and for controlling the operation of said airbag folding mechanism.

2. The airbag folding apparatus as recited in claim 1, wherein the airbag folding engine includes an engine driver system and an engine control system.

3. An airbag apparatus removably mounted on an airbag folding engine said airbag folding apparatus comprising:

a plate removably mounted on said airbag folding engine; and and airbag folding mechanism mounted on said plate for folding an airbag, said airbag folding mechanism being operatively adapted to be removably and operably connected to the airbag folding engine for effecting the operation of said airbag folding mechanism and for controlling the operation of said airbag folding mechanism.

4. The airbag folding apparatus as recited in claim 3, wherein the airbag folding engine includes an engine driver system and an engine control system.

5. An apparatus for folding one of a number of types of airbags, said airbag folding apparatus being removably mounted on an airbag folding engine including an engine driver system and an engine control system, said airbag folding apparatus comprising:

a plate removably mounted on the airbag folding engine, and an airbag folding mechanism mounted on said plate for folding an airbag.

\* \* \* \* \*

UNITED STATES PATENT AND TRADEMARK OFFICE
CERTIFICATE OF CORRECTION

PATENT NO. : 5,772,570
DATED : June 30, 1998
INVENTOR(S) : William Joseph Budde, Douglas Michael Donahue, Jr., Louis Anthony Fany and Scott Franklin Mason It is certified that error appears in the above-identified patent and that said Letters Patent is hereby corrected as shown below:

Col. 10, line 5, "folding engine said" should be --folding engine, said--.

Col. 10, line 26, "folding engine," should be --folding engine;--.

Signed and Sealed this

Tenth Day of November 1998

Attest:

BRUCE LEHMAN

Attesting Officer

Commissioner of Patents and Trademarks